May 9, 1967

I. BROWNING ETAL 3,318,157

ACCELERATION-DECELERATION INDICATOR

Filed Nov. 17, 1964

INVENTORS
IBEN BROWNING
EDWARD R. STRAND

BY TOWNSEND & TOWNSEND

United States Patent Office 3,318,157
Patented May 9, 1967

3,318,157
ACCELERATION-DECELERATION INDICATOR
Iben Browning, Sunnyvale, and Edward R. Strand, Santa Clara, Calif., assignors, by mesne assignments, to Edward R. Strand
Filed Nov. 17, 1964, Ser. No. 411,814
1 Claim. (Cl. 73—492)

The present invention is directed in general to apparatus for testing acceleration and deceleration of vehicles.

There are many occasions when it is desired to test the acceleration and deceleration of a vehicle such as, for example, an automobile. Typical situations are those in which a highway patrol officer or a highway department official wishes to make a test of the braking capability of an automobile to determine its operating safety margin. Naturally, if every patrolman and department official is to be equipped with a testing device which must be relatively standard, the cost of the instrument must be maintained at a minimum.

One device that has been used in the past by highway officials for testing the braking capability of automobiles is a standard sized object such as a cylindrical block of wood which has a certain critical specific gravity and center of mass. The test of the braking effectiveness of an automobile is performed by the testing official by simply placing the testing block on the seat of the automobile being tested, accelerating the automobile to a given speed, and then rapidly applying the automobile brakes. If the brakes of the automobile are good enough to stop or decelerate the vehicle in a required distance, the decelerating forces on the block cause the block to be thrown forward off the seat where it has been resting. Obviously this testing device cannot be used as an absolute standard since the seat incline is not standard in all automobiles.

A slightly modified test similar to that just described is the placement of a standard sized object of the type described on the floor of the automobile. The test is performed by braking the automobile, and the brakes are proved sufficiently operable if, in the course of deceleration, the block is tipped over. However, it is obvious that the performance of this test is affected by the floor level and texture of the floor covering such as either a rubber mat or a carpet as well as the floor location with respect to the automobile center of gravity.

The object of the present invention is to provide an acceleration and deceleration testing device which can easily be manufactured and mounted onto a vehicle for testing and produce a relatively accurate indication of accelerating and decelerating forces on the vehicle during operation.

Broadly stated, the present invention, to be described in greater detail below, is directed to an acceleration and deceleration testing and measuring device including a weighted member which is yieldably supported within a housing that can be fixedly secured to any vehicle, preferably by suction cups. The housing is provided with indication or meter arms which are rotatably positioned within the housing and coupled to the weighted member for displacement due to associated movement of the weighted member with the indicating arms sufficiently rigidly held against rotation that they remain in their displaced position at the end of the test for indicating in cooperation with an associated scale the displacement of the weighted member during the test.

One of the advantages of the present invention lies in the fact that an accurate indication of the acceleration or deceleration forces applied to the weighted member during the test is recorded for an indication of just how safe the vehicle being tested is.

In accordance with the preferred embodiment of the present invention, a pair of indicating arms are mounted in the housing and positioned on opposite sides of the weighted member for indicating the movement of the weighted member in either the forward or backward direction. This construction permits the testing device to be placed on either side of the automobile and permits testing of both acceleration and deceleration of the vehicle without any adjustment of the testing device between the acceleration and deceleration tests.

In accordance with still another embodiment of the present invention, the mounting spring for the weighted member is provided with greater resistance in one direction so that separate scales can be used for the different indicating arms. With this construction, it is possible to give maximum swing to the weighted arm under either acceleration or deceleration where the magnitude of the applicable forces differ greatly. Maximum swing minimizes error in the recorded forces due to tilt of the automobile body.

Other objects of the present invention will become apparent upon reading the following specification and referring to the accompanying drawing in which similar characters of reference represent corresponding parts in each of the several views.

While the present invention can be utilized for determination of the accelerating and decelerating forces present in any vehicle, it is particularly adaptable for use with automobiles by highway officials and will therefore be described in detail with respect to such use.

Figure 1:
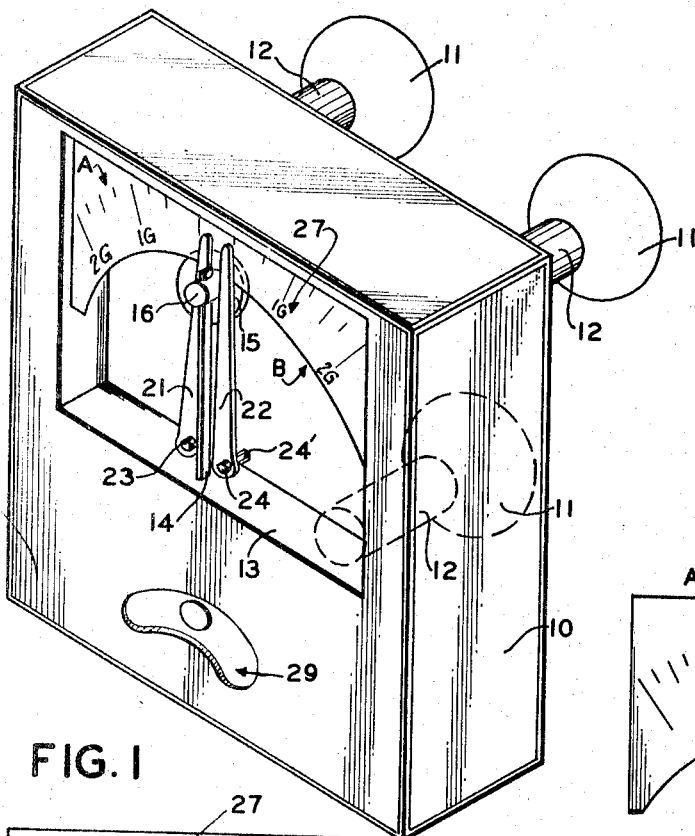
FIG. 1 is a perspective view of a testing apparatus embodying the present invention.
Figure 2:
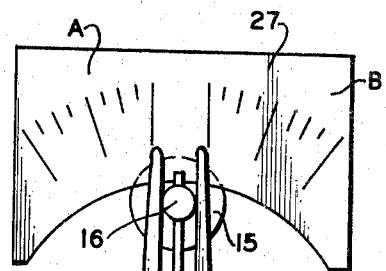
FIG. 2 is an enlarged elevational view, partially in section, of a portion of the apparatus shown in FIG. 1.

Referring now to the drawing with particular reference to FIGS. 1 and 2, the testing apparatus includes a housing 10 which can be of any particular shape and provided with means for readily attaching the housing to a vehicle. By way of example, the housing is provided with at least three suction cups 11 which are mounted on the back of the housing 10 by means of support posts 12. The suction cups permit attachment of the housing to any portion of the vehicle, preferably the window of the automobile.

Inside the housing a generally horizontal mounting bracket 13 is provided in which a spring member such as, for example, a leaf spring 14, is fixedly secured. A weighted member 15 is mounted at the other end of the leaf spring 14 by means of a mounting rod 16 which projects forwardly of the housing 10 from the spring.

A pair of indicating arms 21 and 22 are rotatably mounted at their one end in the housing 10 by, for example, screws 23 and 24 in posts 23' and 24' on opposite sides of the leaf spring 14. The screws 23 and 24 are tightened to an extent loose enough to permit movement of the indicating arms 21 and 22 in response to forces applied thereto by the mounting rod 16 of the weighted member 15 but sufficiently tight to hold the indicating arms 21 and 22 in the deflected position after the weighted member 15 has returned to its initial position at the end of the test.

The housing 10 is also provided with a scale panel 27 which is provided with graduated indicia forming two indicating scales A and B on opposite sides of the weighted member 15 for indicating in combination with the indicating arms 21 and 22 the amount of force or "G's" applied to the weighted member during an acceleration or deceleration test.

The housing 10 is also provided with a window 28 which permits viewing of the indicating arms and scale 27 for determining at the end of the test the amount of the forces acting on the weighted member during the test by noting the position of the indicating arms 21 and/or 22.

The housing 10 is also provided with a spirit level 29 which can be viewed from the front of the housing so that, in initially placing the housing on an automobile, the housing is aligned horizontally. In this connection, the leaf spring 14 is mounted substantially vertically within the housing 10 so that under normal conditions at rest no gravitational forces applied to the weight produce a deflection in the position of the weight to move either of the indicating arms 21 or 22.

Figure 3:
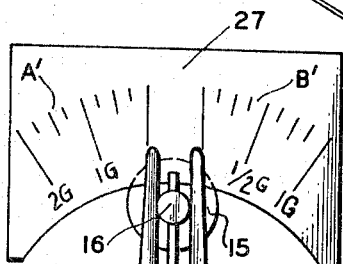
FIG. 3 is a view similar to FIG. 2 illustrating an alternative embodiment of the present invention.

An alternative embodiment of the present invention is illustrated in FIG. 3 which shows an auxiliary leaf spring 14' positioned along one side of the leaf spring 14 for providing greater resistance to the movement of the weighted member 15 in one direction, i.e., to the left, as shown in FIG. 3. This construction permits use of different scales for the indicating arms 21 and 22 for recording forces of greatly different magnitude with the two arms 21 and 22. For example, far greater forces are encountered in braking or decelerating an automobile than can be encountered in accelerating the normal stock automobile. Therefore, in order to use a large swing of the spring 14 for minimizing errors due to tilt of the automobile body during acceleration and deceleration, the scale A' to the left of the spring 14 associated with the indicating arm 21 covers a higher range than the scale B' on the opposite side of the weighted member associated with the indicating arm 22 for use of the testing apparatus facing to the left side of the longitudinal axis of the automobile onto which it is attached. In this case, the weighted member moves to the right, as shown in FIG. 3, during acceleration where the G forces are relatively low and to the left during deceleration where the forces can be relatively high.

While the preferred embodiment of the present invention is the utilization of a leaf spring for mounting the weighted member and actuating the indicating arms 21 and 22, it is obvious that other types of spring means could be used. For example, coiled springs could be attached on opposite sides of the weighted member such that the acceleration and deceleration forces acting upon the weighted member during the test counteract the forces of the coiled springs to move the weighted member against the indicating arms to produce an indication of the acceleration and deceleration forces.

The following table indicates the maximum decelerating forces produced in a series of tests with the present invention and involves travel at the initial velocity indicated, then slamming on of the brakes extremely hard.

| Initial velocity (m.p.h.): | Maximum braking deceleration (G's) |
|---|---|
| 10 | 1⅜ |
| 10 | 1⅜ |
| 20 | 1¼ |
| 30 | 1⅛ |
| 20 | ⅞ |
| 30 | 1 |
| 20 | 1¼ |
| 20 | 1⅛ |

In order to damp movement of the arm actuating mechanism and prevent overshooting of the spring and indicating arms the housing can be filled with a damping fluid such as, for example, clear oil which will also serve to prevent weathering of the operating elements of the testing apparatus.

Although the foregoing invention has been described in some detail by way of illustration and example for purposes of clarity of understanding, it is understood that certain changes and modifications may be practiced within the spirit of the invention as limited only by the scope of the appended claim.

It is claimed:

Apparatus for testing acceleration and braking of a vehicle comprising: a housing; a leaf spring member; means for supporting the lower end of said spring member in said housing; a weight member; means for connecting the upper end of said spring means to said weight member for permitting said weight to be moved in variable accordance with acceleration and deceleration forces applied to said housing; a pair of indicating arms located on opposite sides of said weight member; means for rotatably supporting said indicating arms within said housing whereby said arms are displaced in response to forces applied to said weight member and remain in their displaced position when said forces are relieved; an auxiliary leaf spring member, means for mounting the lower end of said auxiliary leaf spring member immediately adjacent the lower end of said first spring member with said auxiliary leaf spring member lying adjacent said first spring member along its entire length for providing a greater resistance to forces applied to said weight means on one side of said spring member; a scale associated with said indicating arms and provided with indicia for indicating the displacement of each of said arms during movement of said weight under acceleration or deceleration forces and thereby the magnitude of the acceleration and deceleration forces whereby during acceleration or deceleration, the arms are moved to positions associated with said indicia for indicating the forces applied during a test and said arms remain in said displaced position when said forces are relieved, a spirit level for indicating a position for said housing with said first and said auxiliary spring members positioned vertically therein.

References Cited by the Examiner

UNITED STATES PATENTS

| 2,021,667 | 11/1935 | Miess | 73—515 X |
| 2,494,109 | 1/1950 | Wolfe | 73—517 X |
| 2,695,776 | 11/1954 | Burg | 73—492 X |
| 2,924,442 | 2/1960 | Gray | 73—492 |

FOREIGN PATENTS 1,134,790  12/1956  France.

RICHARD C. QUEISSER, *Primary Examiner.*

J. J. GILL, *Assistant Examiner.*